United States Patent
Park et al.

(10) Patent No.: US 10,187,901 B2
(45) Date of Patent: Jan. 22, 2019

(54) RADIO RESOURCE ALLOCATION METHOD AND APPARATUS FOR DEVICE TO DEVICE COMMUNICATION IN MOBILE COMMUNICATION SYSTEM

(71) Applicant: Samsung Electronics Co., Ltd., Gyeonggi-do (KR)

(72) Inventors: Seunghoon Park, Seoul (KR); Hyunseok Ryu, Gyeonggi-do (KR); Youngbin Chang, Gyeonggi-do (KR); Chiwoo Lim, Gyeonggi-do (KR); Kyungkyu Kim, Gyeonggi-do (KR); Sangkyu Baek, Gyeonggi-do (KR); Sungjin Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/102,522

(22) PCT Filed: Jan. 9, 2015

(86) PCT No.: PCT/KR2015/000267
§ 371 (c)(1),
(2) Date: Jun. 7, 2016

(87) PCT Pub. No.: WO2015/105387
PCT Pub. Date: Jul. 16, 2015

(65) Prior Publication Data
US 2016/0323922 A1  Nov. 3, 2016

(30) Foreign Application Priority Data
Jan. 10, 2014 (KR) ........................ 10-2014-0003328

(51) Int. Cl.
*H04Q 7/00* (2006.01)
*H04W 72/12* (2009.01)
(Continued)

(52) U.S. Cl.
CPC ....... *H04W 72/1278* (2013.01); *H04W 24/10* (2013.01); *H04W 72/042* (2013.01);
(Continued)

(58) Field of Classification Search
CPC ............. H04W 76/023; H04W 72/042; H04W 72/1278; H04W 24/10; H04W 72/1231; H04W 72/121; H04W 92/18
(Continued)

(56) References Cited

U.S. PATENT DOCUMENTS 8,359,038 B2   1/2013  Hakola et al.
9,319,931 B2 *  4/2016  Lim .................... H04W 72/085
(Continued)

FOREIGN PATENT DOCUMENTS

WO  WO 2012/159270 A1  11/2012
WO  WO2013028044     *  2/2013
WO  WO2014175990     *  10/2014

OTHER PUBLICATIONS

International Search Report dated Mar. 26, 2015 in connection with International Patent Application No. PCT/KR2015/000267, 13 pages.
(Continued)

*Primary Examiner* — Chuong T Ho

(57) ABSTRACT

A method for supporting a device to device (D2D) communication in a base station of a mobile communication system according to one embodiment of the present specification comprises the steps of: determining one or more device groups including one or more devices among a plurality of devices; determining radio resources for measuring channels for the determined device groups; and transmitting, to the devices included in the respective groups, information on the radio resources for measuring the channels corresponding to the groups. According to the embodiment of the present specification, complexity of measuring a channel (Continued)

state in the D2D communication is reduced, and many more devices can measure the channel state using limited radio resources and can transmit and receive data. The present disclosure relates to re-5th-Generation (5G) or 5G communication system to be provided for supporting higher data rates Beyond 4th-Generation (4G) communication system such as Long Term Evolution (LTE).

16 Claims, 16 Drawing Sheets

(51) Int. Cl.
    *H04W 24/10*     (2009.01)
    *H04W 72/04*     (2009.01)
    *H04W 76/14*     (2018.01)
    *H04W 92/18*     (2009.01)

(52) U.S. Cl.
    CPC .......... *H04W 76/14* (2018.02); *H04W 72/121* (2013.01); *H04W 72/1231* (2013.01); *H04W 92/18* (2013.01)

(58) Field of Classification Search
    USPC ........................................ 370/329, 328, 330
    See application file for complete search history.

(56) References Cited

U.S. PATENT DOCUMENTS

| | | | |
|---|---|---|---|
| 10,039,096 B2* | 7/2018 | Yang | H04W 74/0816 |
| 2011/0261767 A1* | 10/2011 | Ji | H04L 5/0053 |
| | | | 370/329 |
| 2012/0106517 A1* | 5/2012 | Charbit | H04W 72/04 |
| | | | 370/336 |
| 2012/0322484 A1 | 12/2012 | Yu et al. | |
| 2013/0012221 A1 | 1/2013 | Zou et al. | |
| 2013/0148637 A1 | 6/2013 | Yang et al. | |
| 2013/0150061 A1 | 6/2013 | Shin et al. | |
| 2014/0003262 A1 | 1/2014 | He et al. | |
| 2014/0094183 A1 | 4/2014 | Gao et al. | |
| 2015/0146633 A1* | 5/2015 | Kalhan | H04L 1/1607 |
| | | | 370/329 |
| 2015/0289282 A1* | 10/2015 | Phuyal | H04W 56/00 |
| | | | 370/329 |
| 2016/0037547 A1* | 2/2016 | Yang | H04W 4/70 |
| | | | 370/329 |
| 2016/0323868 A1* | 11/2016 | Kalhan | H04W 72/1278 |
| 2016/0330781 A1* | 11/2016 | Kalhan | H04W 72/1278 |

OTHER PUBLICATIONS

Written Opinion of the International Searching Authority dated Mar. 26, 2015 in connection with International Patent Application No. PCT/KR2014/000267, 6 pages.

* cited by examiner

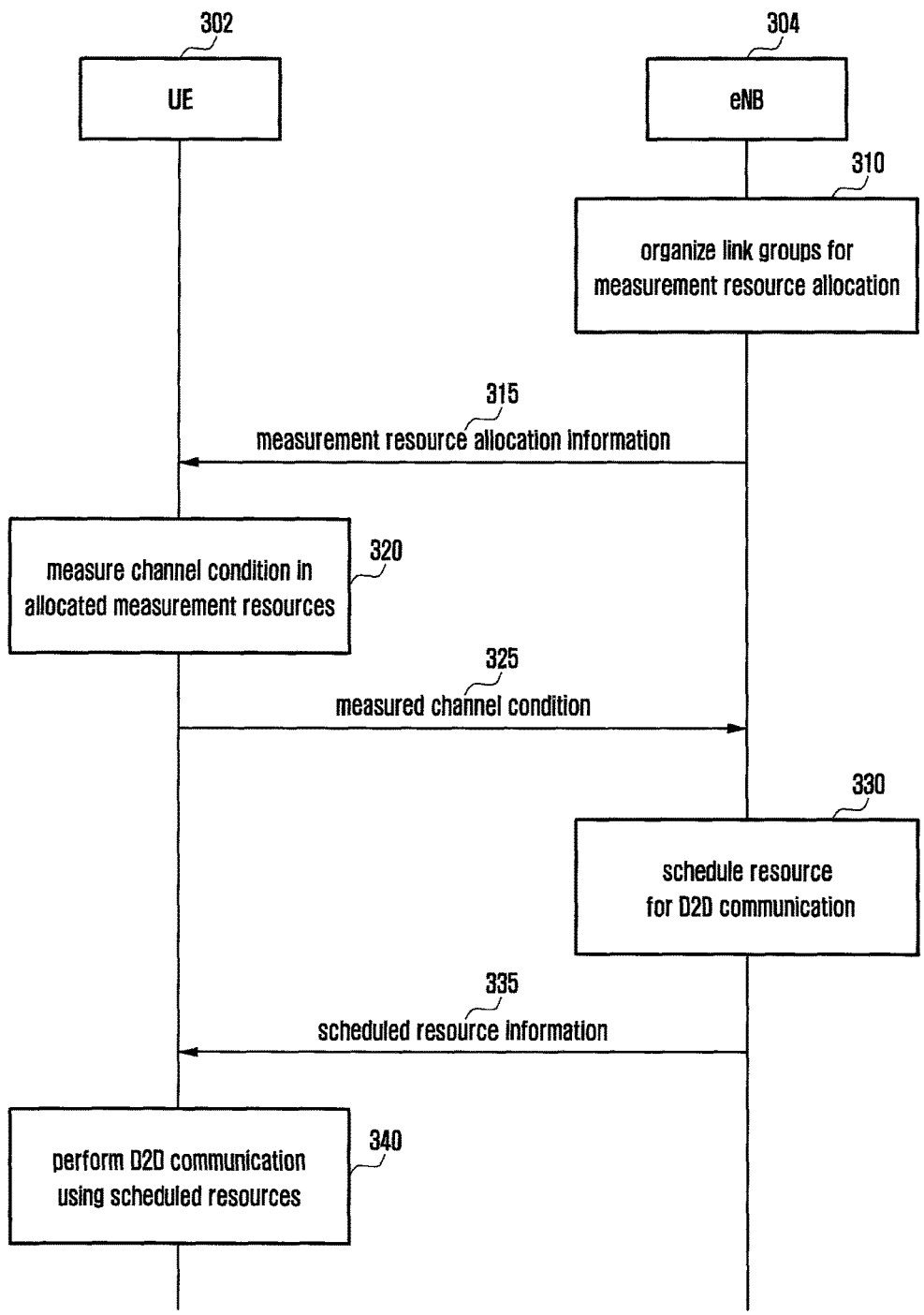

FIG. 6
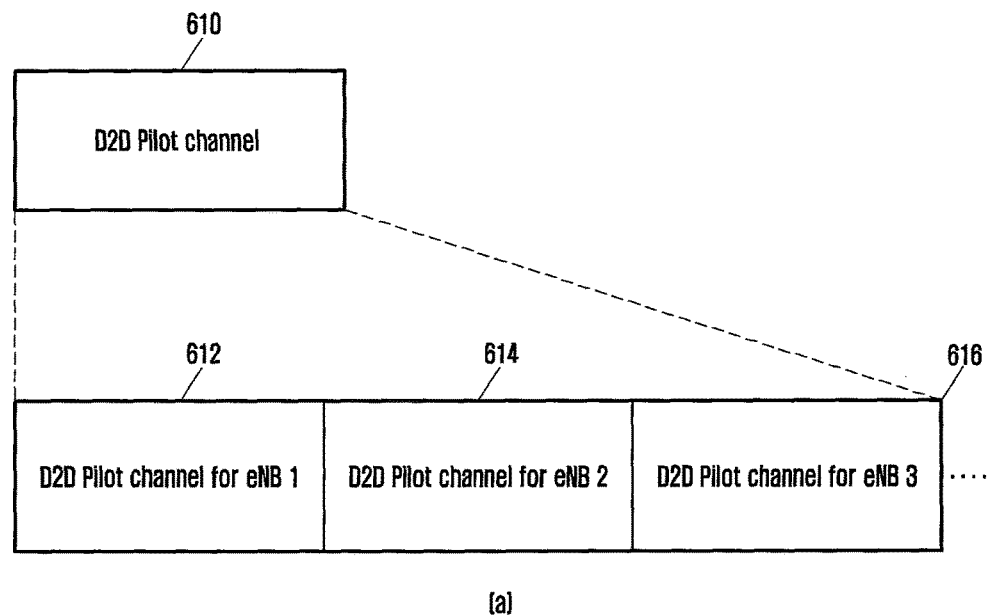
(a)
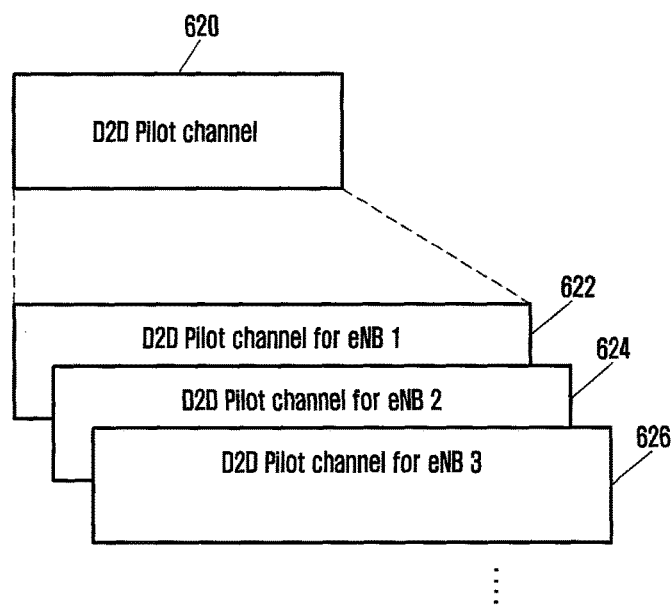
(b)

RADIO RESOURCE ALLOCATION METHOD AND APPARATUS FOR DEVICE TO DEVICE COMMUNICATION IN MOBILE COMMUNICATION SYSTEM

CROSS-REFERENCE TO RELATED APPLICATION(S)

The present application claims priority under 35 U.S.C. § 365 to International Patent Application No. PCT/KR2015/000267 filed Jan. 9, 2015, entitled "RADIO RESOURCE ALLOCATION METHOD AND APPARATUS FOR DEVICE TO DEVICE COMMUNICATION IN MOBILE COMMUNICATION SYSTEM", and, through International Patent Application No. PCT/KR2015/000267, to Korean Patent Application No. 10-2014-0003238 filed Jan. 10, 2014, each of which are incorporated herein by reference into the present disclosure as if fully set forth herein.

TECHNICAL FIELD

The present invention relates to a method and apparatus for allocating radio resources for D2D communication in a mobile communication system. In particular, the present invention relates to a method and apparatus for allocating radio resources efficiently based on channel status information transmitted by terminals.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the popularization of smartphones, data traffic is increasing rapidly. The increasing number of smartphone users spurs the consumption of smartphone-based application services such as SNS and games, resulting in an unprecedented increase in data traffic. Particularly, beyond the person-to-person communication, if the machine intelligent communication (such as person-to-machine and machine-to-machine communications) is activated as a new market field, the traffic concentration to the base station will exceed existing limitations.

There is therefore a need for a technology to solve such problems, and direct communication between devices is coming into the spotlight as one such technology. This so called Device to Device (D2D) communication technology is promising for the licensed band communication systems such as cellular communication systems and unlicensed band communication systems such as WLAN systems.

In the case of being combined with mobile communication, the D2D communication is attractive in terms of increasing traffic accommodation capability and reducing overload. That is, since the D2D communication is implemented in such a way that the User Equipments (UEs) located in the same cell or adjacent cells establish a D2D link and exchange data through the D2D link without involvement of any evolved Node B (eNB), it is advantageous to reduce the number of communication links from 2 to 1.

Researches on the unlicensed band aim to distinguish among person-to-person, person-to-machine, and machine-to-machine communications for protecting against unnecessary waste of radio resources and to provide the communication service in a local traffic-suited manner. That is, the focus is on a method for a plurality of devices to broadcast and receive the information on contents efficiently.

Unlike in the legacy ad-hoc/sensor networks, the D2D devices achieve synchronization therebetween first and then perform discovery, paring, and scheduling operations. This makes it possible to improve data and control signal transmission/reception efficiency and to configure a protocol efficiently for a scheduling scheme. That is, the synchronization-based D2D communication technology makes it possible for the distributed devices to communicate control signals efficiently and thus to consider the distributed protocol which has been difficult to be applied for controlling a network without any master node.

However, the distributed scheduling has a drawback in that it is difficult to accomplish maximum capacity because a single master node has to make a resource allocation decision based on partial information of each area without integral channel information of the whole network.

Implementing D2D communication over a cellular network is capable of compensating for problems which are difficult to be overcome in the distributed scheduling. There is therefore a need of an enhanced channel measurement method and apparatus for an eNB to allocate resources efficiently for D2D communication.

DISCLOSURE OF INVENTION

Technical Problem

The present invention aims to provide a method and apparatus for reducing both channel information amount reported by a UE and scheduling complexity of an eNB for D2D communication.

Also, the present invention aims to provide a method and apparatus for making it possible for a D2D receiving UE to measure a channel based on the pilot signal transmitted by a transmitting UE and for reducing both channel information amount reported by a UE and scheduling complexity of an eNB for D2D communication.

Solution to Problem

In accordance with an aspect of the present invention, a Device-to-Device (D2D) communication method of a base station in a mobile communication system includes organizing a plurality of terminals into at least one group including at least one terminal, determining radio resources for channel measurement per group, and transmitting information on the radio resources for channel measurement in the group to the terminals included in each group.

In accordance with another aspect of the present invention, a Device-to-Device (D2D) communication method of a terminal in a mobile communication system includes receiving information concerning radio resources for channel measurement from a base station, and transmitting a signal for measuring channels based on the information concerning the radio resource for channel measurement, wherein the terminal belongs to a group including at least one terminal determined by the base station, and the terminals belonging to the group are allocated the same radio resources for channel measurement.

In accordance with another aspect of the present invention, a base station supporting Device-to-Device (D2D) communication in a mobile communication system includes a transceiver which transmits/receives signals and a control unit which controls the transceiver, organizes a plurality of terminals into at least one group including at least one terminal, determines radio resources for channel measurement per group, and controls transmitting information on the radio resources for channel measurement in the group to the terminals included in each group.

In accordance with still another aspect of the present invention, a terminal for performing Device-to-Device (D2D) communication in a mobile communication system includes a transceiver which transmits/receives signals and a control unit which controls the transceiver to receive information concerning radio resources for channel measurement from a base station and transmit a signal for measuring channels based on the information concerning the radio resource for channel measurement, wherein the terminal belongs to a group including at least one terminal determined by the base station, and the terminals belonging to the group are allocated the same radio resources for channel measurement.

Advantageous Effects of Invention

The present invention is advantageous in terms of reducing channel measurement complexity for D2D communication and in that a large number of UEs can measure channels and communicate data using limited radio resources.

BRIEF DESCRIPTION OF DRAWINGS

FIG. 3 is a signal flow diagram illustrating a communication procedure between a UE and an eNB for D2D communication according to an embodiment of the present invention;

FIG. 6 is a diagram illustrating a channel structure for D2D communication radio resource allocation according to an embodiment of the present invention;

MODE FOR THE INVENTION

Figure 1:
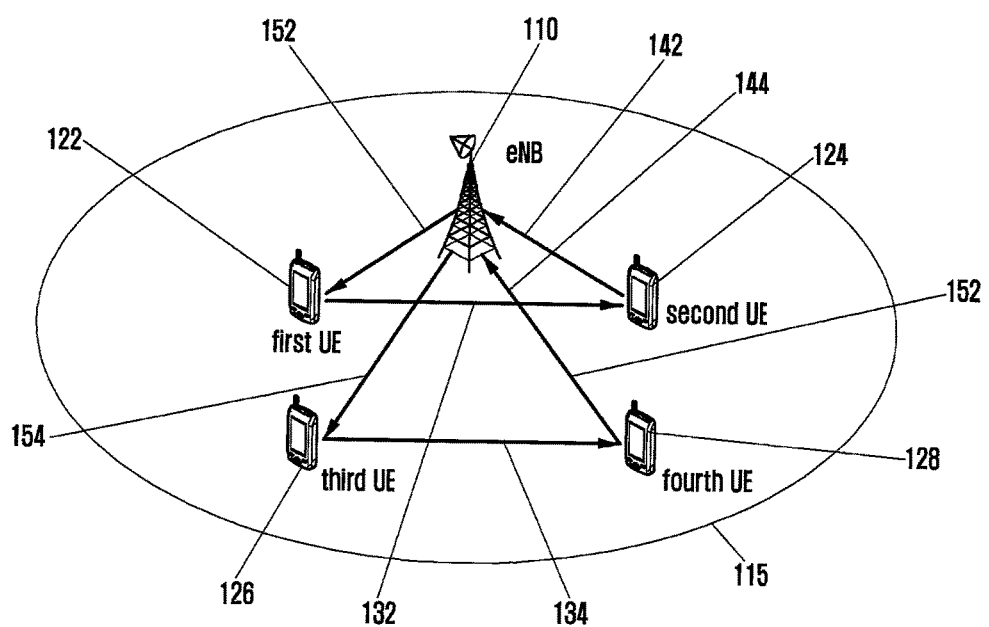
FIG. 1 is a diagram illustrating a D2D communication environment with an eNB scheduling communications according to an embodiment of the present invention.

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and modules may be combined into fewer components and modules or further separated into additional components and modules. In addition, the components and modules may be implemented such that they execute one or more CPUs in a device or a secure multimedia card.

The ad-hoc/sensor networks such as Wi-Fi and ZigBee networks may basically use Carrier Sense Multiple Access with Collision Avoidance (CSMA-CA) as a contention-based resource access scheme without scheduling-based resource allocation. The CSMA-CA is widely used for the case where the number of UEs is small because of making it possible to perform collision-free data communication without extra complex network management. In the case where there are a large number of Wi-Fi users, however, the data rate drops too significantly to meet user's satisfaction and thus there is a need of researches for a more enhanced access scheme.

Although Time Division Multiple Access (TDMA) is the most efficient resource access scheme for the case where a master node manage resources, if there are multiple master nodes, they have to negotiate with each other for resource allocation, resulting in increase of extra control signal overhead and delay. Accordingly, the TDMA scheme is not appropriate for a network extendable over a wide-area.

FlashLinQ modifies the Request-to-Send (RTS) and Clear-to-Send (CTS) control signals of the CSMA-CA scheme for use in the TDMA scheme. By taking notice of the legacy researches concerning measurement of Signal-to-Interference Ration (SIR) using the RTS and CTS over a wi-fi out-band, it may be possible to improve throughput, in comparison with wi-fi, in a certain environment by modifying the signals to operate along with Orthogonal Frequency Division Multiplexing (OFDM) in a synchronous network.

Meanwhile, the Long Term Evolution Proximity Service-based (LTE ProSe-based) D2D communication which is under discussion may allow to establish one D2D link on the transmission resource per cell if the conventional transmission resource allocation scheme in which an eNB schedules transmission resources based on the radio resource measurement report is used.

The contention-based access scheme such as CSMA-CA is superior in capability and inferior in efficiency while the contention-free resource allocation scheme such as TDMA is superior in efficiency and inferior in scalability. The FlashLinQ which is conceived to overcome the problems is designed for a network having a D2D link established between devices and characterized by defining slots as in TDMA for efficiency and using a Round Robin scheme for allocating slot resources for there is no centralized master node responsible for resource allocation. The FlashLinQ allocates resources for the adjacent D2D links cyclically and, if possible, allows transmission over multiple links simultaneously. In order to accomplish this, the links are assigned priorities and the link having the highest priority is allocated resources. Other links are managed to measure interference from the link having the high priority and signal power thereof to calculate SIR and perform simultaneous transmission when the SIR is higher than a threshold. The current link is also manage to calculate the SIR in consideration of the interference which it causes to the link having the high priority and perform simultaneous transmission when the SIR is higher than the threshold. As described above, the FlashLinQ can achieve high resource reusability with the distributed scheduling.

In the case of D2D communication over cellular networks, the device has to measure interference to and from other D2D links as well as the receiving power of its link and report the measurement results to the eNB. However, this method has a drawback in that the control information overload increases exponentially along with the increase of scheduling complexity as the number of D2D links increases.

Therefore, there is a need of a method for improving resource reusability while reducing both the control information amount of radio channel measurement result and scheduling complexity for D2D communication over cellular networks.

Exemplary embodiments of the present inventions are described hereinafter with reference to accompanying drawings.

FIG. 1 is a diagram illustrating a D2D communication environment with an eNB scheduling communications according to an embodiment of the present invention.

Referring to FIG. 1, the first to fourth UEs 122, 124, 126, and 128 may communicate signals within the cell 155 formed by the eNB 110.

According to an embodiment of the present invention, the first UE 122 may transmit a signal to the second UE 124 as denoted by reference number 132 using the resources allocated by the eNB 110 as denoted by reference number 152. Also, the third UE 126 may transmit a signal to the fourth UE 128 as denoted b reference number 134 using the resources allocated by the eNB 110 as denoted by reference number 154.

The second and fourth UEs 124 and 128 may report channel status measured based on the received signal to the eNB 110 as denoted by reference numbers 142 and 152. At this time, the second UE 124 measures the signal component received from the first UE 122 and the interference component received from the third UE 126 and reports the measurement results to the eNB 110, and the fourth UE 128 measures the signal component received from the third UE 126 and the interference component received from the first UE 122 and reports the measurement results to the eNB 110. In the case of allocating resources to the respective D2D UEs and the D2D UEs report signal and interference components in association with the resources, the resources required for channel measurement and signals which the UEs have to measure increase as the number of D2D UEs increases, resulting in increase of channel status feedback information overhead.

Figure 2A:
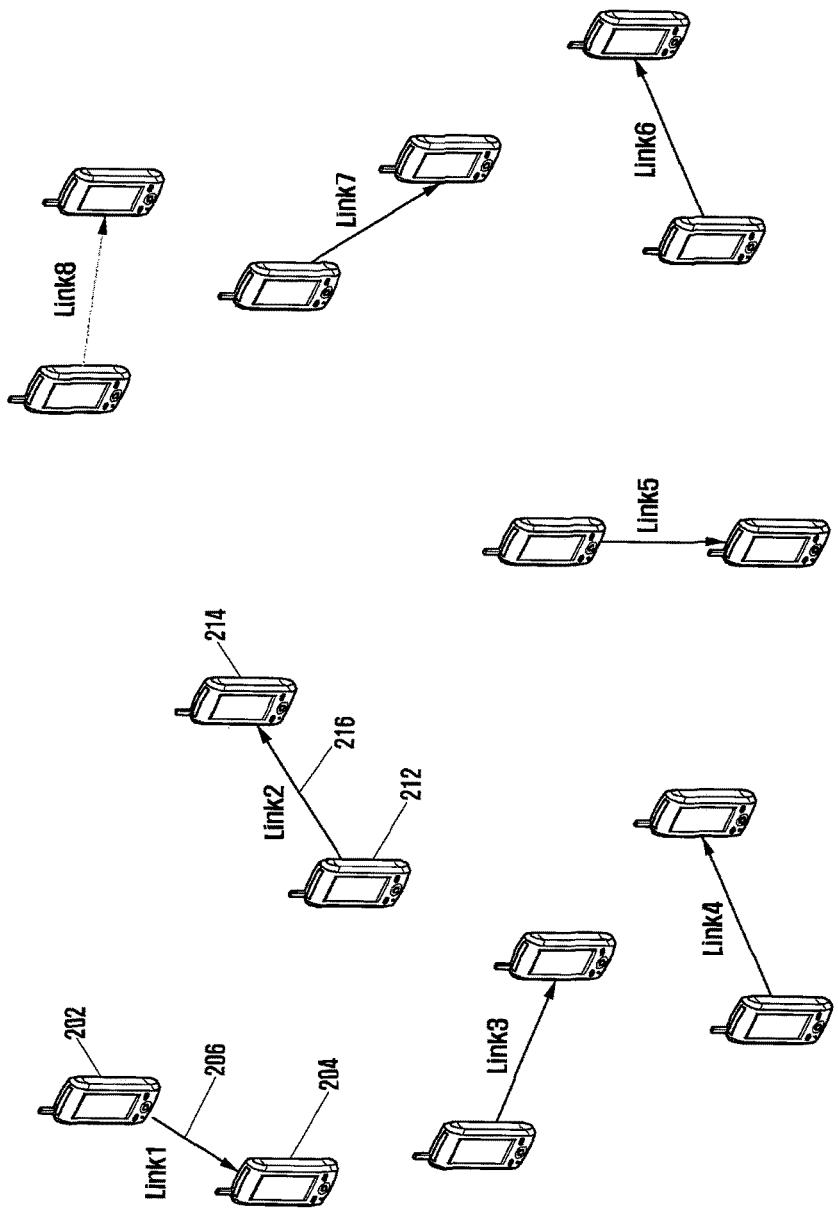
FIGS. 2A and 2B are diagrams illustrating D2D communication links according to various embodiments of the present invention.
Figure 2B:
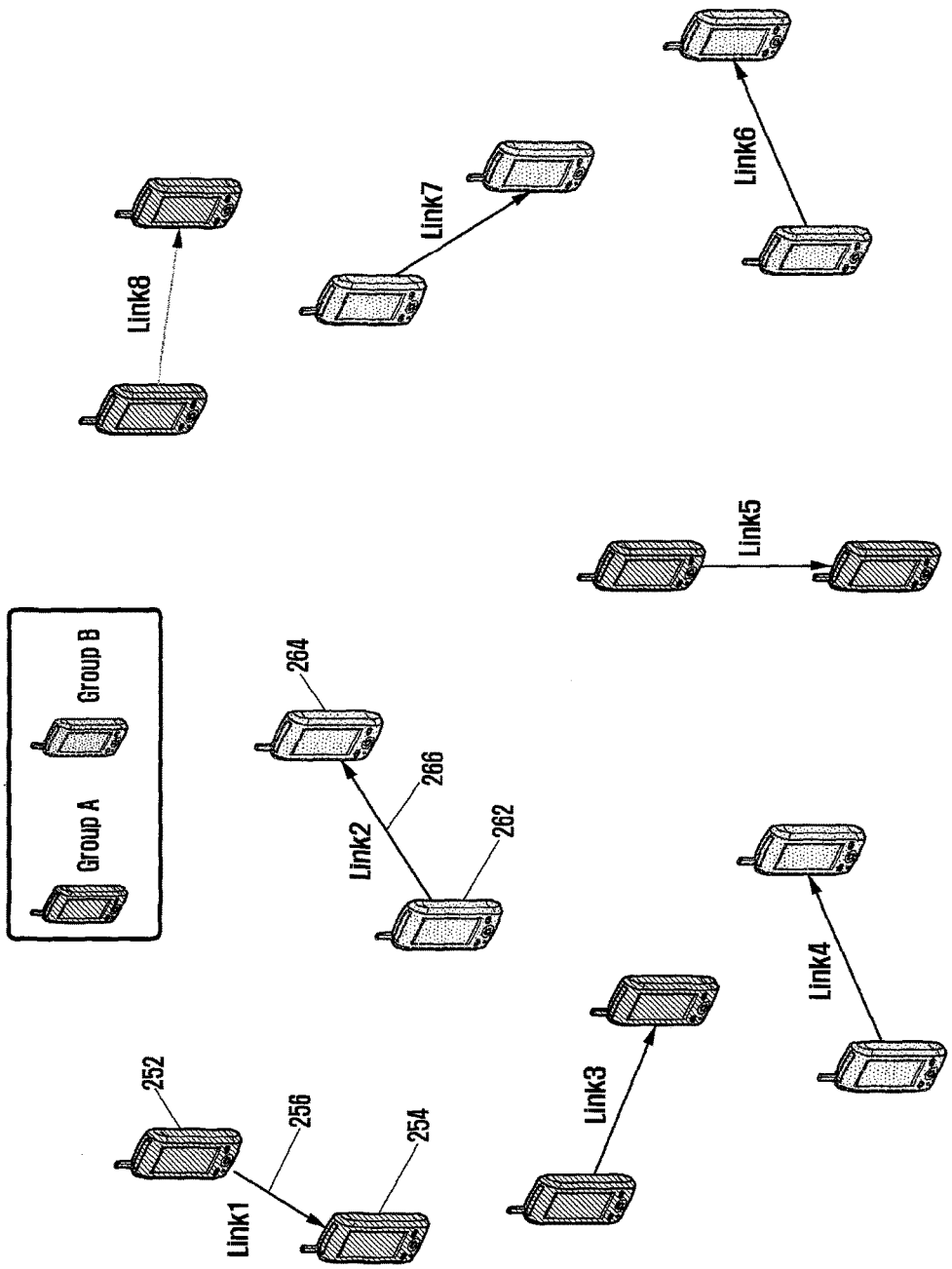

FIGS. 2A and 2B are diagrams illustrating D2D communication links according to various embodiments of the present invention.

Referring to FIGS. 2A and 2B, the UEs may communicate signals for D2D communications and, for convenience, a pair of UEs performing unicast communication may be represented by a concept of link. The transmitting UEs 202 and 212 may transmit signals to the receiving UEs 204 and 214, respectively. At this time, if the first link incurs interference to the second link, this may mean that the transmitting UE of the first link incurs interference to the receiving UE of the second link.

In FIG. 2A, there is a need of 8 radio resource resources corresponding to the respective D2D UEs pairs. Even when the receiving UE performs channel measurement, each receiving UE has to measure 1 signal component and 7 interference components.

In FIG. 2B, the D2D UEs pairs are grouped into groups A and B, and the UE pairs belonging to each group may perform channel measurement in the same radio resources. In this case, it is possible to measure channels with relatively small resource amount and reduce the channel status feedback overhead by allocating two radio resources to the respective groups in order for each UE to measure one signal corresponding to its group and another signal corresponding to the other group, i.e. the signal incurring interference and report the measurement result. In this case, however, if the D2D UEs pairs are adjacent within the group using the same radio resource, the transmitting and receiving signals of the pairs may incur interferences to each other and thus it is necessary to designate the groups depending on the channel conditions of the UEs so as to mitigate the interferences.

According to an embodiment of the present invention, the UE pairs may be grouped into two or more groups according to the arrangement of the UEs.

FIG. 3 is a signal flow diagram illustrating a communication procedure between a UE and an eNB for D2D communication according to an embodiment of the present invention.

Referring to FIG. 3, the UE 302 and the eNB 304 may communicate signals. In an embodiment, the UE 302 may include a transmitter and also a receiver configured for D2D communication. In an embodiment, the term "terminal" may be interchangeably used with the term "UE", and the term "base station" may be interchangeably use with the term "eNB".

The eNB may allocate resources to the UE 302 for channel measurement for D2D communication at step 310. In more detail, the eNB allocates resources to the UE 302 for use in measuring channel condition in such a way of grouping the UEs into at least one group and allocating the measurement resources per group. In an embodiment, the eNB 304 may group the UEs 302 capable of transmitting/receiving signals into at least one group according to the channel conditions of the UEs at step 310. In the case of an intra-group communication, the eNB 304 may select one of the UEs belonging to the same group in a way of minimizing interference.

The eNB 304 may transmit the information on the measurement resources allocated per group to the UE 302 at step 315. In more detail, the measurement resources may include radio resources for measuring channel condition between the UEs for D2D communication. The resource allocation information may include the information on the resources for measuring the channel condition and an index indicating the resources allocated to respective UEs 302 in the plural resource regions. According to an embodiment of the present invention, the eNB 304 and the UE 302 may share index mapping information on the radio resource regions, or the eNB 304 may send the index mapping information to the UE 302 through signaling. According to an embodiment of the present invention, the transmitting UE may receive the resource index information for use in channel measurement, and the receiving UE may receive the resource index indicating the transmission resource and the resource index indicating the resource allocated to the UE incurring interference. According to an embodiment, the transmitting UEs included in the same group may be allocated the same resources. In this case, it may be possible to transmit a group-specific resource index other than a UE-specific resource index to reduce resource index transmission load. The eNB 304 may notify the UE 302 of the group index and, if necessary to allocate measurement resources, then the group-specific measurement resource index.

At step 320, the UE 302 may perform channel condition measurement based on the resource index received at step 315. In detail, the UE 302 may perform the channel condition measurement according to a command from the eNB 304. In more detail, the transmitting UE may transmit a reference signal for D2D communication channel measurement using the radio resources indicated by the resource index received from the eNB 304. The reference signal may be one of a pilot signal, a reference signal, and a channel state measurement signal. The receiving terminal may measure at least one of the signal component transmitted by the transmitting UE paired with the receiving UE and the interference signal component transmitted by a UE not paired with the receiving UE. According to an embodiment, the receiving UE may measure the signal strength of the signal received in the resource indicated by the resource index and the signal strength of the interference component. According to an embodiment, the receiving UE may not perform measurement on the signal received in the resource allocated to a certain group, and the index which is not related to the signal measurement resource may be determined according to at least one of the weight and priority of the group, i.e., by comparing the group to which the receiving UE belongs and a certain group according to at least one of the weight and priority of the group.

The UE 302 may report the measure channel condition to the eNB 304. In detail, the receiving UE may report at least one of the signal component and interference component to the eNB. According to an embodiment, the UE 302 may report the resource index related to the signal having the received signal strength which is greater than a predetermined threshold value among the signals to the eNB 304. According to an embodiment, the UE 302 may report the resource index related to the signal having the received signal strength which is less than a predetermined threshold value among the interference signals to the eNB 304. It may be possible to report a group-specific resource index representing to multiple resource indices by referencing the group-specific resource indices agreed between the eNB 304 and the UE 302.

At step 330, the eNB 304 may perform resource scheduling for D2D communication based on the information received at step 325. According to an embodiment, the eNB 304 may perform the resource scheduling for D2D communication in further consideration of at least one of latency, Service of Quality (QoS), and number of retransmissions. In the case of using the information received at step 325, the eNB 304 may perform the scheduling in a way of excluding at least one UE belonging to the group of indices indicating the signals incurring significant interference to the receiving UE of the link allocated the resource already in the scheduling procedure. The eNB 304 may also schedule the UEs belonging to the group in which the sum of interferences is equal to or less than a predetermined threshold. In the case of reporting a plurality of group index corresponding to a group of UEs or a set index to the eNB, it may be possible to schedule the UEs of the group having the resource index corresponding to the set by applying the same policy.

At step 335, the eNB 304 may transmit the information on the resource scheduled at step 330 to the UE 302.

At step 340, the UE 302 may perform D2D communication based on the information received at step 335.

Figure 4:
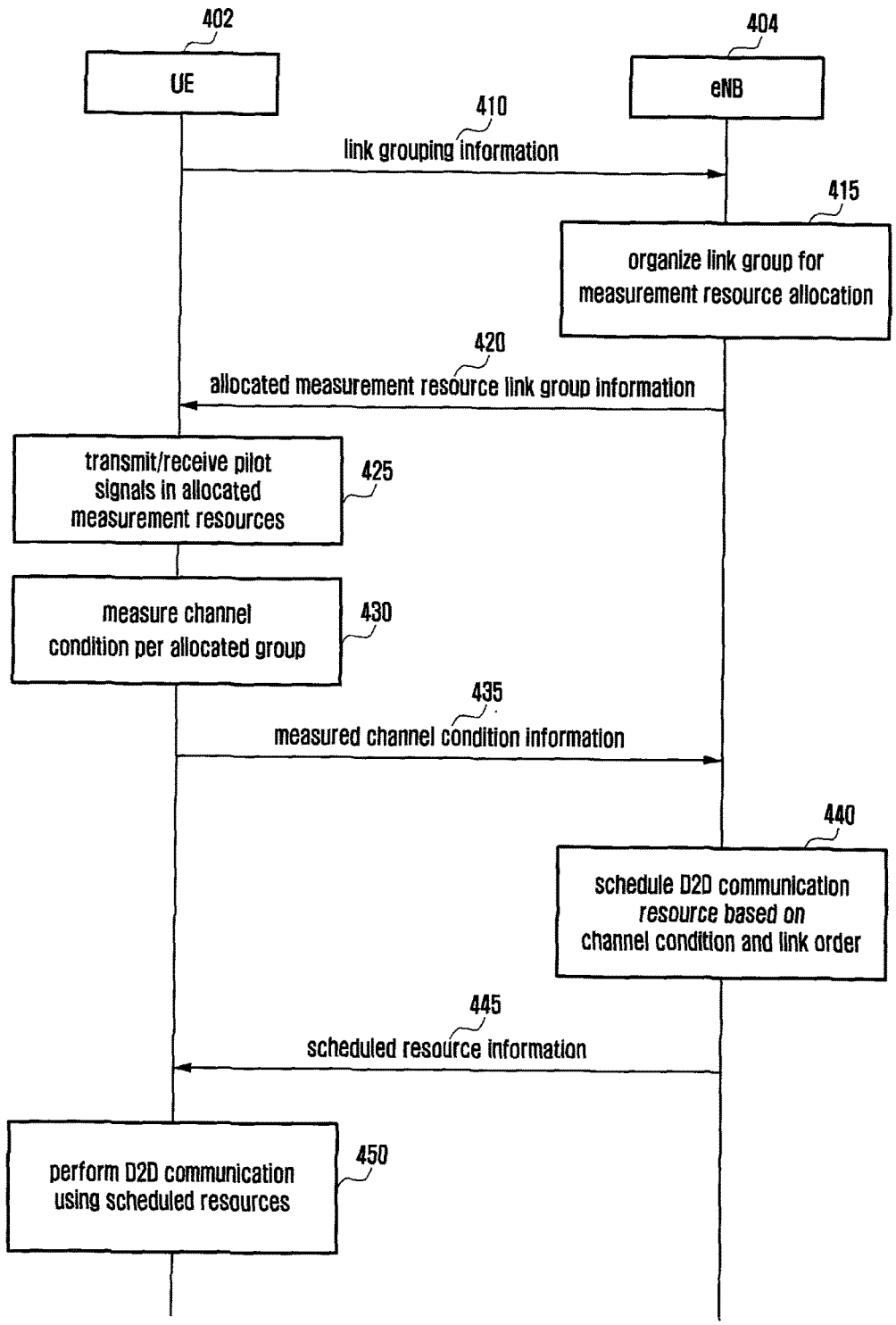
FIG. 4 is a signal flow diagram illustrating a signal transmission/reception procedure between a UE and an eNB for D2D communication according to another embodiment of the present invention.

FIG. 4 is a signal flow diagram illustrating a signal transmission/reception procedure between a UE and an eNB for D2D communication according to another embodiment of the present invention.

Referring to FIG. 4, the UE 402 and the eNB 404 may communicate signals. In an embodiment, the UE 402 may include a transmitter and also a receiver operating over a link configured in a network for D2D communication.

The UE 402 may transmit information concerning the grouping links to the eNB 404 at step 410. In an embodiment of the present invention, grouping the links may include an operation of organizing a group of UEs using the same resources for channel measurement for D2D communication. According to an embodiment, the link grouping information may include the information on the neighboring eNBs and the neighboring UEs around the UE 402. The neighboring eNB information may be identified based on the strength of the signal received from corresponding neighboring eNB, and the neighboring UE information may be identified by the strength of the signal received from the corresponding neighboring UE around the UE 402. The signals received from the neighboring UEs may include at least one of a discovery signal, a paging signal, a communication control signal, and a communication data signal. The identified neighboring eNB or UE information is reported to the eNB for use in grouping the links. In detail, if the grouping information is received, the eNB may organize the UEs having a low interference probability into a group based on the received information.

The eNB 404 may allocate channel measurement resources to the UE 402 for D2D communication at step 415. In detail, when allocating the resources for channel condition measurement to a plurality UEs 402, the eNB may organize the plural UEs 402 into at least one group and allocate the same measurement resource to the UEs of the same group. In an embodiment, it may be possible to organize the UEs 402 capable of communication signals with the eNB 404 into at least one group according to the channel condition of the UE. The eNB 404 may organize the UEs into at least one group in a way of minimizing intra-cell interferences among the transmitting and receiving UEs within the same group. In order to minimize the intra-cell interferences, it may be possible to organize the UEs of which interference signal strengths are less than a predetermined threshold value into a group. According to an embodiment, the eNB 404 may organize a link group based on the information received at step 410. According to an embodiment of the present invention, the eNB 404 may organize the UEs having an interference probability high in view of the adjacent signal similarity due to the close locations, into the same temporary groups based on the information received at step 410 such that each UE belongs to at least one temporary group. After organizing the temporary groups, the transmitting and receiving UEs having a link in each temporary group are included in the first link group. Next, the transmitting and receiving UEs having another link in each temporary group are included in the second link group. This may be repeated until no UE is remained in the temporary groups. According to another embodiment, the eNB may calculate a dissimilarity degree based on the information received at step 410 to organize the link groups based on the dissimilarity degrees of the pairs. The eNB 404 may also organize the UEs 402 into groups depending on whether the UEs are performing at least one of unicast, multicast, and broadcast transmissions.

At step 420, the eNB 404 may send the UE 402 the measurement resources allocation information generated based on the group organized at step 415. In detail, the measurement resources may include the radio resources for channel condition measurement between UEs. In more detail, the resources allocation information may include the information on resources for use by the UE 402 in measuring channel condition and may include an index indicating the resources allocated to the UEs 402 or a group of UEs in multiple resource regions. According to an embodiment, the eNB 404 and UE 402 may share index mapping information for the radio resource regions, or the eNB 404 may send the index mapping information to the UE 402 through signaling. According to an embodiment, the transmitting UE may receive the resource index information for use in channel measurement, and the receiving UE may receive the resource index indicating the transmission resource and the resource index indicating the resource allocated to the UE incurring interference. According to an embodiment, the transmitting UEs included in the same group may be allocated the same resources. According to another embodiment, the eNB 404 may transmit a control resource index indicating the D2D communication control channel resource structure or a preconfigured D2D communication control channel structure to the UE 402 through a broadcast channel (BCH) and System Information Block (SIB). The control resource may include at least one resource block or at least one subframe. According to another embodiment, the eNB 404 may send the UE 402 the information on the control resource index related to the D2D discovery channel resource structure or pre-configured D2D discovery channel structure which has been informed to the UE 402 through the BCH and SIB. The control resource may include a plurality of Resource Blocks or a plurality of subframes. In detail, the control resource may be a plurality of resource blocks across multiple subframes allocated in consideration of a hopping pattern.

At step 425, the UE 402 may transmit/receive reference signals for use in measuring channel condition based on the information received at step 420. The reference signal may be a pilot signal. In detail, each transmitting UE may transmit a pilot signal using the measurement resource indicated by an assigned resource index, and the receiving UE may receive the pilot through the measurement resources indicated by the assigned resource index and the pilot signals transmitted by other transmitting UEs through the measurement resources indicated by the non-assigned resource indices.

At step 430, the UE 402 may measure the channel based on the signals transmitted/received at step 425. According to an embodiment, the receiving UE may measure the signal strength of the signal received with the resource index corresponding to the signal component and the signal strength of received interference components. According to an embodiment, the receiving UE may selectively skip performing measurement on the signal with the resource index corresponding to a specific group, and the resource index indicating the measurement-skipped resources may be determined based on the weight or priority of the group. The weight or priority of the group may be included in a policy received from the eNB at step 420.

The UE 402 may report the information on the measured channel condition to the eNB 404 at step 435. In detail, the receiving terminal may report the information on at least one of the signal and interference components. According to an embodiment, the UE 402 may report the channel condition with a resource index indicating the resources in which the received signal strength is equal to or greater than a predetermined threshold value among the interference signals. The UE 402 may report the resource index indicating the resources in which the received signal strength is equal to or less than the predetermined threshold value among the interference signals. The received signal strength may be at least one of Reference Signal Received Power (RSRP), Reference Signal Received Quality (RSRQ), Signal-to-Noise Ratio (SNR), and Signal-to-Interference Ratio (SIR). The threshold value may be a value notified by the eNB for scheduling or a value specified in the standard. In detail, the threshold value may be an absolute value being compared with the received signal power in unit of dBm or a relative value being compared with at least one of RSRQ, SNR, and SIR in unit of dB. The UE 402 may also report the channel condition with a set index representing a plurality of resource indices, the set index being selected among the set indices agreed between the eNB 404 and the UE 402. In an embodiment, the UE 402 may report the channel condition along with a received signal power or modulation level per resource index or a precoding matrix index for performance enhancement.

At step 440, the eNB 404 may perform resource scheduling for D2D communication based on the information received at step 435. According to an embodiment, the eNB 404 may perform resource scheduling for D2D communication in further consideration of at least one of latency, Service of Quality (QoS), number of retransmissions, and service group priority. In more detail, the eNB 404 may determine the weight or priority of a least one link in further consideration of at least one of the latency, service quality, number of retransmissions, and service group priority, and then determine the order of links to allocate resources. The eNB 404 may determine the links for which resource allocation is available in a resource region according to the resource allocation order of the links based on the information received at step 435. For example, the eNB may allocate resource to the link listed first in the resource allocation order, check whether the link listed second in the resource allocation order may be allocated resource simultaneously along with the first link, and allocate resources to the second link depending on the check result. The eNB may also check whether it is available to allocate resources to the link listed third in the resource allocation order simultaneously along with the first and second links and determine whether to allocate the resources to the second link depending on the check result. In detail, the eNB 404 may perform scheduling in a way of excluding the link belonging to the group indicated by the index received with the interference component of which SIR is equal to or greater than a predetermined threshold value or the signal component of which SIR is equal to or less than a threshold value. In an embodiment, when calculating the SIR, the eNB regards the signal with the received signal power value reported by a UE in the measurement resources allocated to the group it belongs to as the required signal and the signal with the received signal power reported by a UE in the measurement resources allocated to a previously resource-allocated group or link as the interference signal. The eNB may perform scheduling in a way of including the links belonging to the group indicated by the index received with the interference signal having the SIR equal to or less than a threshold value or the signal having the SIR equal to or greater than the threshold value on the previously resource-allocated link. The eNB 404 may also perform scheduling in a way of regarding the links of which inter-link interference signals sum is equal to or less than a predetermined value as a set. In the case that the UE reports the channel condition with one set index, the eNB may perform the scheduling operation by applying the same policy to the transmitting and receiving UEs belonging to the group having the resource index corresponding to the set. In more detail, if the UE reports, the channel condition with one set index, the eNB may perform the scheduling operation by applying the same policy to the transmitting and receiving UEs of all links belong to the group having the resource index corresponding to the set. The eNB 404 may perform the scheduling operation in the order of a predetermined per-group resource allocation order other than the order of a predetermined per-link resource allocation order. In this case, if a group is allocated resources in the scheduling procedure, this means that all of the transmitting and receiving UEs on the links belonging to the group are allocated the corresponding resources. In an embodiment, if a set of UEs are organized into a group or allocated the same radio resources, the eNB may allocate the same group M-RNTI or the same C-RNTI. In more detail, it may be possible to allocate resources to the UEs belonging to the same group using a group M-RNTI for multicasting or using a group C-RNTI for unicasting. That is, the group M-RNTI or group C-RNTI may indicate all links belonging to the group or a link for the case of unicasting and be used to allocate transmission resources to the transmitting UE on each link and reception resources to the receiving UE on each link simultaneously.

At step 445, the eNB 404 may send the UE 402 the information on the resource scheduled at step 440 with a UE-specific RNTI or group RNTI.

At step 450, the UE may perform D2D communication based on the information received at step 445.

Figure 5:
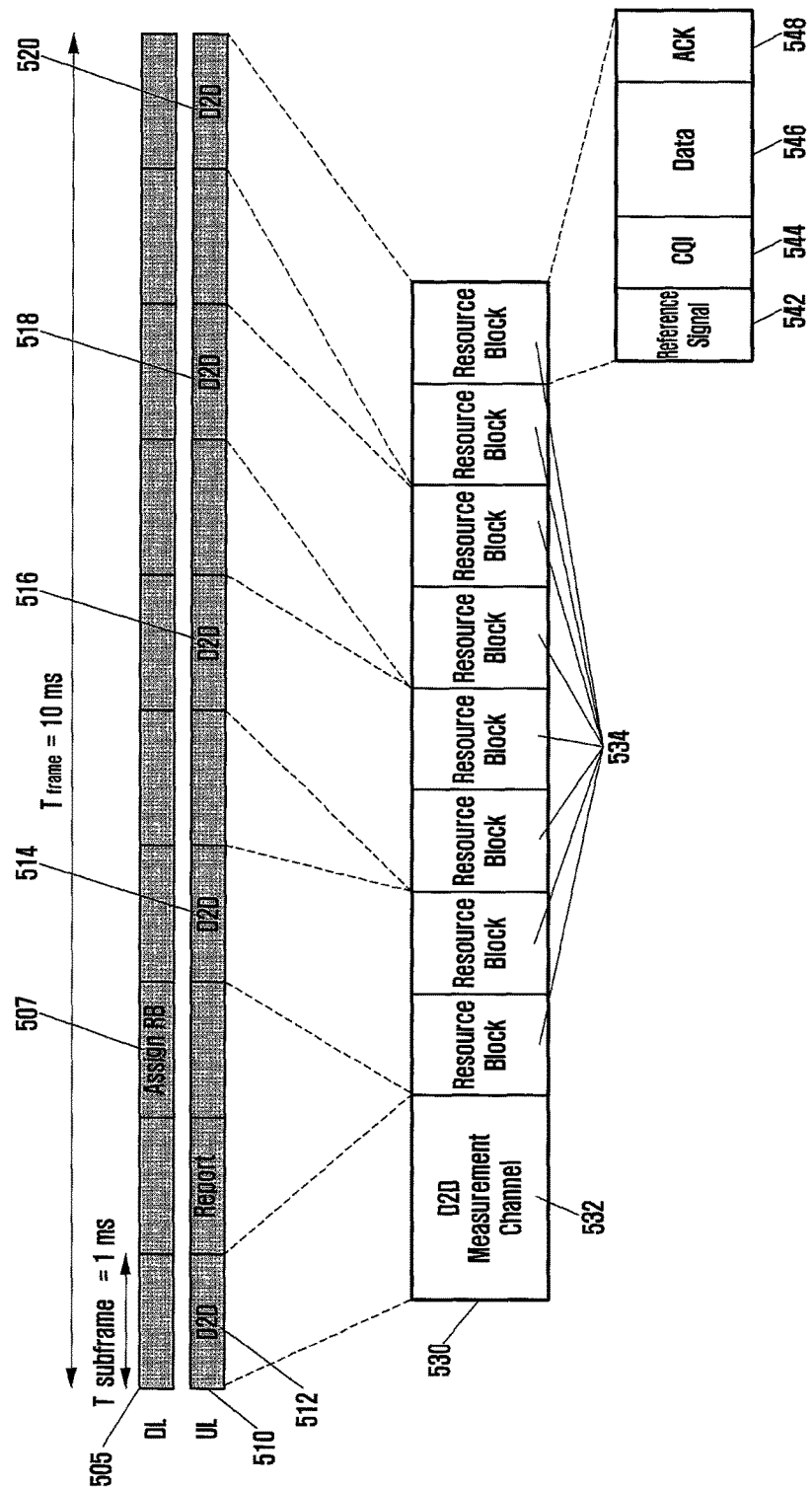
FIG. 5 is a diagram illustrating a radio resource allocation mechanism for D2D communication according to an embodiment of the present invention.

FIG. 5 is a diagram illustrating a radio resource allocation mechanism for D2D communication according to an embodiment of the present invention.

FIG. 5 shows the downlink resource 505 and the uplink resource 510 for communicating signals between an eNB and a UE. In an embodiment, the UE may receive D2D communication resource allocation information from the eNB through the resource block allocation information (Assign RB) 507 in downlink.

Some parts 512, 514, 516, 518, and 520 of the uplink resource 510 may be allocated for D2D communication. The resource may be allocated in eNB's scheduling operation and may include channel measurement resource 532 and data communication resource 534. According to an embodiment, the data communication resource 534 may include at least one of reference signal region 542, a channel quality indication region 544, data transmission region 546, and ACK/NACK transmission region 548. The reference signal region 542 and channel measurement resource 532 are similar to each other in terms of being used for channel condition measurement, but the channel measurement resource 532 is characterized by measuring the signal in separated resources for the transmitting UEs of the links or groups while the reference signal region 542 is characterized by measuring the signal in non-separated resource for the transmitting UEs and, if there is any error in the link or group scheduling result, the receiving UE may send the transmitting UE a suitable value in the channel quality indication region 544 based on the reference signal measurement result of the transmitting UE.

FIG. 6 is a diagram illustrating a channel structure for D2D communication radio resource allocation according to an embodiment of the present invention.

Revering to FIG. 6, a pilot channel allocated to the UE for channel measurement in the uplink radio communication resource may include pilot signal transmission resource regions allocated by different eNBs. In detail, part (a) of FIG. 6 shows a channel structure for canceling interference between eNBs which allocate D2D resources independently for channel measurement.

The D2D pilot channel 610 may include pilot channels of the first to third eNBs 612, 614, and 616; the eNB-specific pilot channels are configured as separate resource regions. In the case, the link grouping is performed per eNB.

In another embodiment of part (b) of FIG. 6, the D2D pilot channel 620 may include pilot channels 620, 622, and 624 of the first to third eNBs; the eNB-specific pilot channels may be transmitted using a common resource region. In this case, the link grouping is commonly performed by the eNBs with a shared group index. According to an embodiment, the eNB-specific pilot channels may be logically separated with cell-specific preambles and, in this case, eNB-specific link groupings are performed independently as shown in part (a) of FIG. 6.

Figure 7:
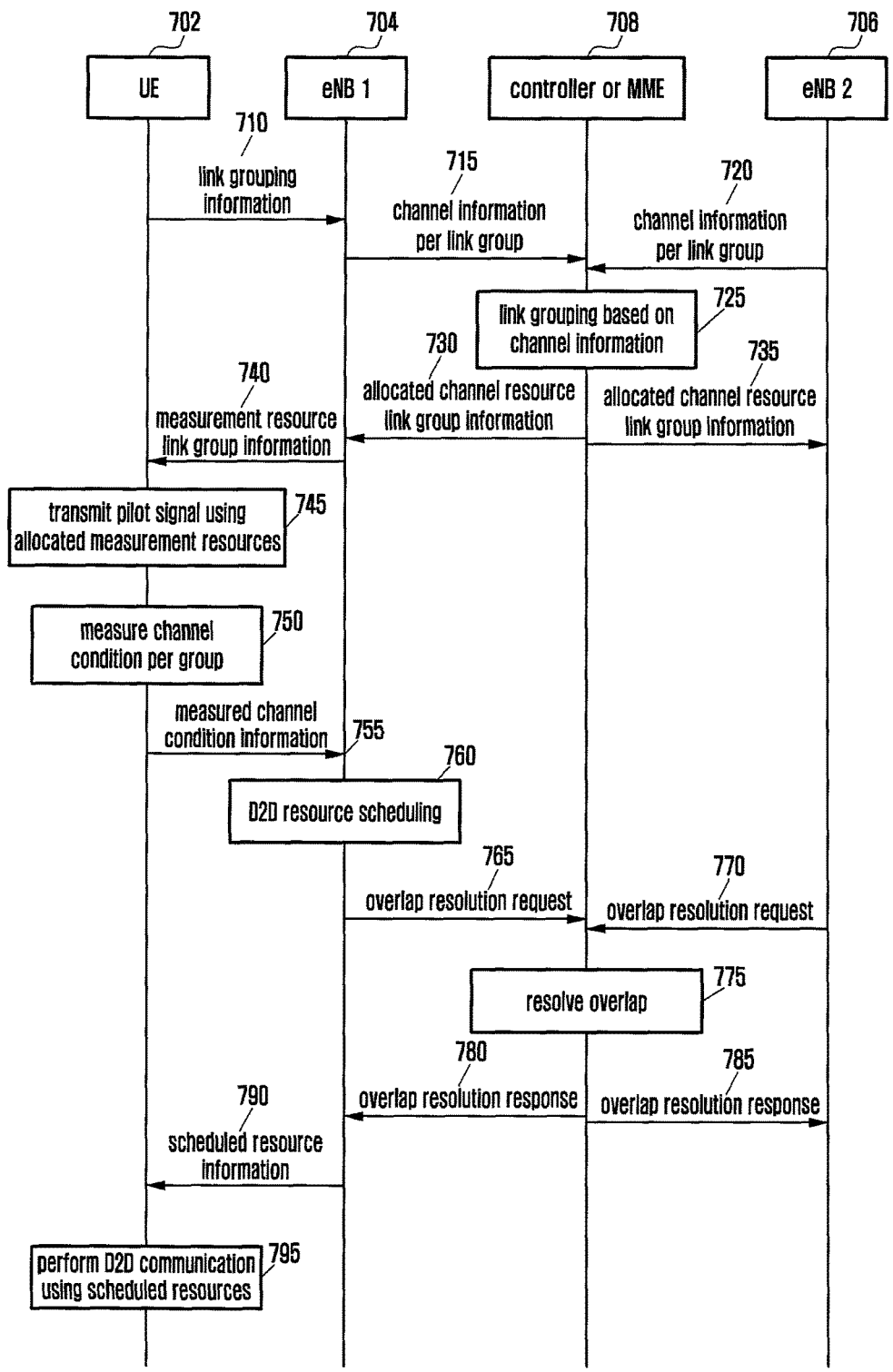
FIG. 7 is a signal flow diagram illustrating signal flows between entities for resolving the link overlap problem in a communication system including a controller according to an embodiment of the present invention.

FIG. 7 is a signal flow diagram illustrating signal flows between entities for resolving the link overlap problem in a communication system including a controller according to an embodiment of the present invention.

Referring to FIG. 7, a UE 702, a first eNB 704, a second eNB, and a controller 708 exchange signals. In an embodiment, the UE 702 may include both a transmitter and a receiver for D2D communication. The controller may be a Mobility Management Entity (MME).

The UE 702 may transmit link grouping information to the first eNB 704 at step 710. This step may be performed in a similar way to step 410 of FIG. 4.

At steps 715 and 729, the first and second eNBs 704 and 706 may transmit channel information of a link group to the controller 708 based on the link grouping information received at the previous step. It may be possible to assume that the second eNB 706 receives the link grouping information from a UE which is capable of performing communication with the second eNB 706 at the previous step.

At step 725, the controller 708 may perform link grouping based on the information received at steps 715 and 720. In detail, it may be possible to allocate the same measurement resource index to the UE which is capable of using the resources for D2D communication based on the information received from the eNBs. As described above, the controller may allocate the same radio resources in consideration of channel condition between the UEs in the cells formed by plural eNBs At steps 730 and 735, the controller 708 may transmit the information generated at step 725 to the respective eNBs.

The first eNB 704 may transmit the measurement resource link group information to the UE 702 based on the information received at step 730.

At step 745, the UE 702 may transmit a pilot signal in the allocated measurement resource based on the information received at step 740. Step 745 may be performed in a similar way to step 425. In an embodiment, steps 715 to 740 may be performed selectively.

At step 750, the UE 702 may measure the channel condition based on the signals transmitted at step 745. Step 750 may be performed in a similar way to step 430 of FIG. 4.

At step 755, the UE 702 may report the measured channel condition information to the first eNB 704. Step 755 may be performed in a similar way to step 435 of FIG. 4.

At step 760, the first eNB 704 may perform resource scheduling for D2D communication based on the information received at step 755. Step 760 may be performed in a similar way to step 435 of FIG. 4.

At steps 765 and 770, in the case that plural eNBs allocate the same resources based on the resource scheduling result for D2D communication or that whether to allocate resources to the same group is different between UEs, the first and second eNBs 704 and 706 may transmit an overlap resolution request to the control unit 708. The overlap resolution request may include at least one of the information corresponding to the information received at step 755 and the information on the resource scheduled at step 760.

If overlap occurs in resource allocation for D2D communication based on at least one of the information received at step 770 and the information used for grouping at step 725, the controller 708 may generate new resource allocation information for resolving the overlap at step 775.

At steps 780 and 785, the controller 708 may transmit the new resource allocation information generated at step 775 to the first and second eNBs 704 and 706 respectively. In an embodiment, steps 765 to 780 may be performed selectively.

At step 790, the first eNB 704 may transmit the information on the resources scheduled based on the information received at step 780 to the UE 702.

According to an embodiment, the if the D2D resource scheduling is performed by the controller other than the eNB at step 760 and then the scheduled resource information is transmitted from the controller to the UE via the eNB, steps 765, 770, 775, 780, and 785 for overlap resolution request, overlap resolution, and overlap resolution acknowledgement may be omitted.

At step 795, the UE 702 may perform D2D communication based on the information received at step 790.

Figure 8:
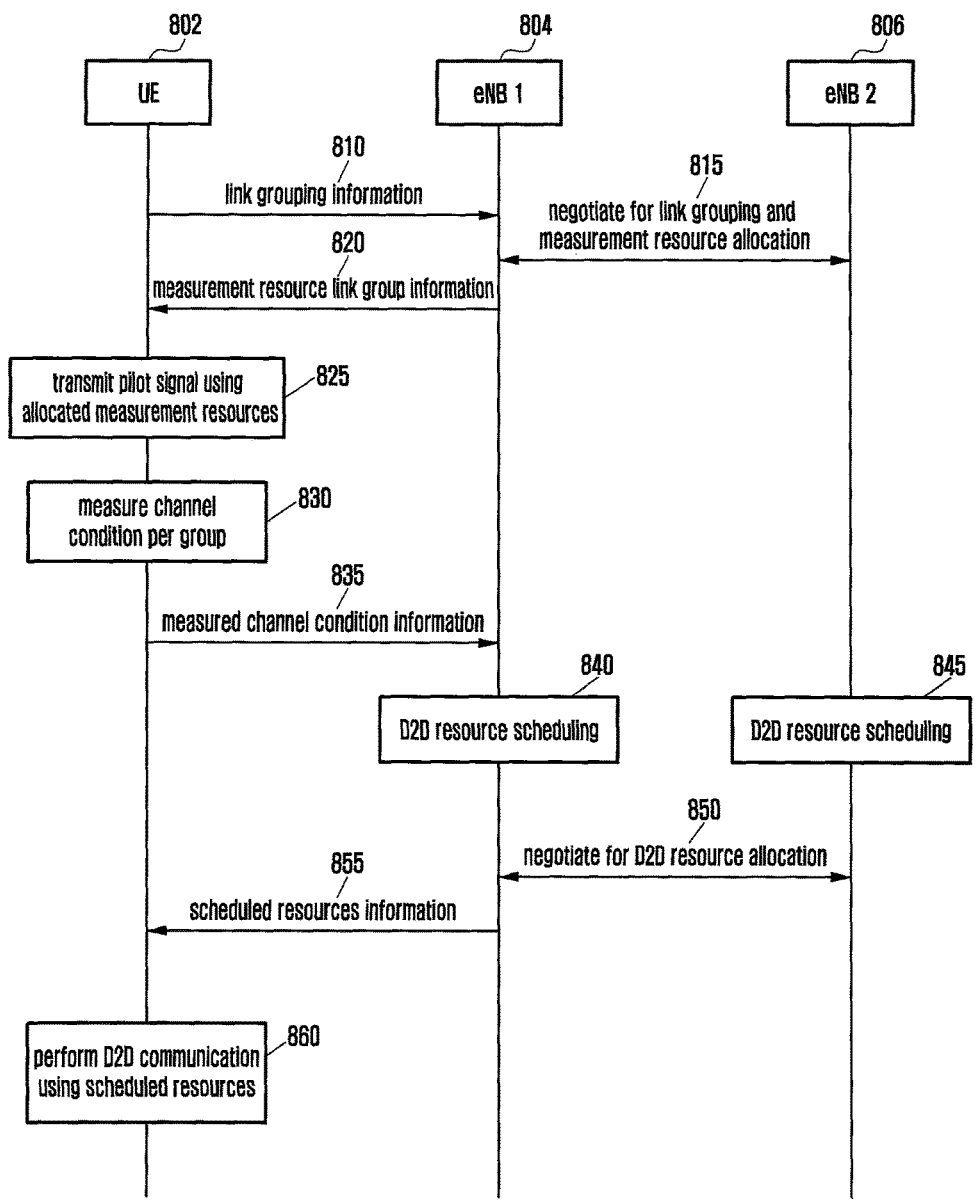
FIG. 8 is a signal flow diagram illustrating signal flows among entities for negotiation between eNBs to resolve the link overlap problem in D2D communication according to an embodiment of the present invention.

FIG. 8 is a signal flow diagram illustrating signal flows among entities for negotiation between eNBs to resolve the link overlap problem in D2D communication according to an embodiment of the present invention.

Referring to FIG. 8, the UE 802 may communicate signals with the first and second eNBs 804 and 806. In an embodiment, the UE 802 may include both a transmitter and a receiver for D2D communication.

At step 810, the UE 802 may transmit link group information to the first eNB 804. This step is performed in a similar way to step 410 of FIG. 4.

At step 815, the first and second eNBs 804 and 806 may perform negotiation for link grouping and measurement resource allocation based on the link grouping information received at the previous step. In an embodiment, it may be assumed that the second eNB 806 receives the link grouping information at a previous step from a UE which is capable of communicating with the second eNB 806.

At step 820, the first eNB 804 may transmit the measurement resource link group information to the UE 802 based on the negotiation result acquired at step 815.

At step 825, the UE 802 may transmit a pilot signal using the measurement resource allocated based on the information received at step 820. Step 825 is performed in a similar way to step 425 of FIG. 4.

At step 830, the UE 802 may measure the channel condition based on the signal transmitted at step 815. Step 830 may be performed in a similar way to step 430 of FIG. 4.

At step 835, the UE 802 may report the measured channel condition information to the first eNB 804. Step 835 may be performed in a similar way to step 435 of FIG. 4.

At steps 840 and 845, the first and second eNBs may perform resource scheduling for D2D communication based on the information received from the UE. Steps 840 and 845 may be performed in a similar way to step 435 of FIG. 4.

At step 850, the first and second eNBs 804 and 806 may perform a radio resource allocation negotiation for D2D communication. In an embodiment, the eNBs may communicate through an X2 interface. Through the negotiation procedure, it may be possible to improve resource allocation reliability for D2D communication between the UEs located in the cells formed by the plural eNBs and organize groups of UEs communicating signals using the same radio resources even in the plural cells.

The first eNB 804 may transmit the radio resource allocation information generated through the negotiation to the UE 802.

Figure 9:
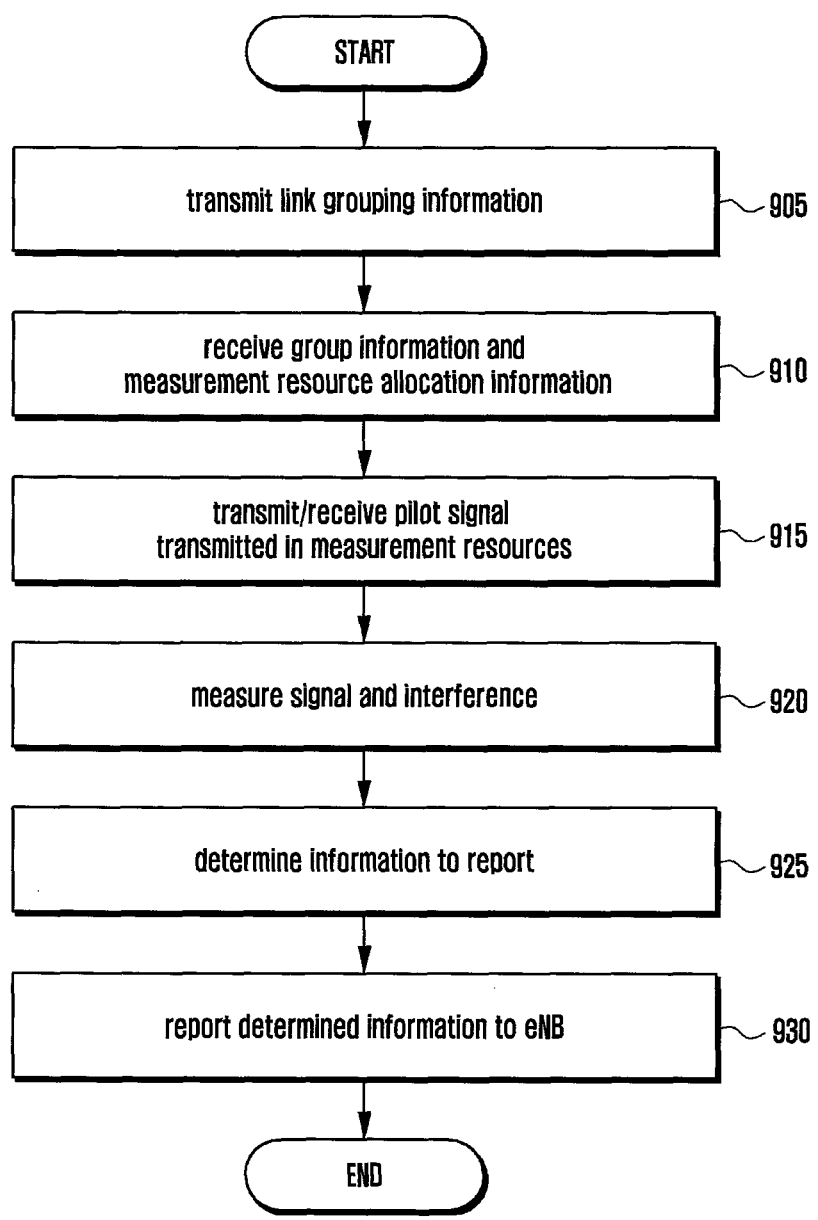
FIG. 9 is a flowchart illustrating a UE operation for D2D communication according to an embodiment of the present invention.

FIG. 9 is a flowchart illustrating a UE operation for D2D communication according to an embodiment of the present invention.

Referring to FIG. 9, the UE may transmit link grouping information to an eNB at step 905. In an embodiment, the link grouping may include an operation of organizing a group of UEs which use the same resources to measure channels for D2D communication. In an embodiment, the link grouping information may include the information on neighboring eNBs and neighboring UEs. The neighboring eNB information may be identified based on the strength of the signal received from the corresponding neighboring eNB, and the neighboring UE information may be identified by the strength of the signal received from the corresponding neighboring UE. The signals received from the neighboring UEs may include at least one of a discovery signal, a paging signal, a communication control signal, and a communication data signal. The identified neighboring eNB or UE information is reported to the eNB for use in grouping the links. Step 905 may be performed selectively.

The UE may receive group information or measurement resource allocation information for use in transmitting a pilot signal from the eNB at step 910. In an embodiment, the UE may include both a transmitter and a receiver, and the measurement resource may include radio resources for measuring channel condition between the transmitting and receiving UEs of each D2D communication link. In an embodiment, the eNB and UE may share index mapping information for radio resource regions, or the eNB 404 may send the index mapping information to the UE 402 through signaling. According to an embodiment of the present invention, the transmitting UE may receive the resource index information for use in channel measurement, and the receiving UE may receive the resource index indicating the transmission resource and the resource index indicating the resource allocated to the UE incurring interference. According to an embodiment, the transmitting UEs included in the same group may be allocated the same resources. The UE may further receive scheduling order information of the groups from the eNB at step 910. The scheduling order information may be understood, at the receiving UE, as the information on the order of the measurement resource indices. The UE may determine the order of measurement resources according to the scheduling order.

At step 915, the UE may transmit/receive the pilot signal using the radio resources allocated based on the information received at step 910. In more detail, each transmitting UE may transmit the pilot signal with the allocated resource index, and the receiving UE may receive the pilot signal transmitted with the resource index corresponding to the signal and the pilot signals transmitted, by other transmitting UEs, with the resource indices corresponding to interferences.

At step 920, the UE may measure channel conditions based on the signal transmitted/received at step 915. In detail, the UE may measure signal and interference amounts, the receiving UE may measure the strengths of the signals received with both the resource index corresponding to the signal component and the resource index corresponding to the interference component. According to an embodiment, the receiving UE may may selectively skip performing measurement on the signal with the resource index corresponding to a specific group, and the resource index indicating the measurement-skipped resources may be determined based on the weight or priority of the group.

At step 925, the HE may determine the information to be reported to the eNB from the measurement information acquired at step 920. The UE may generate the information to be reported to the eNB based on at least one of the interference signal strength, signal component strength, and allocated group index.

At step 930, the UE may report the information generated at step 925 to the eNB.

Figure 10:
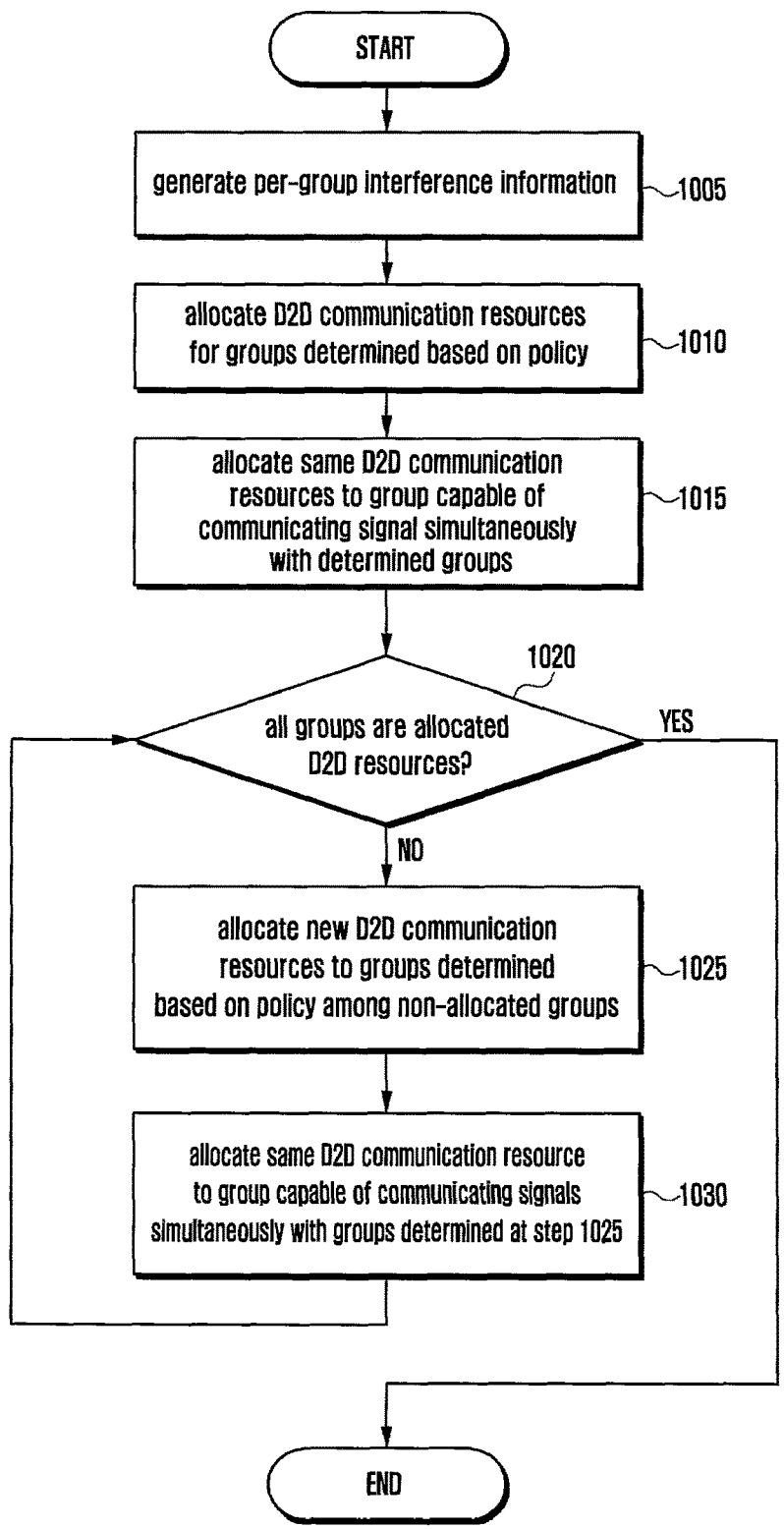
FIG. 10 is a flowchart illustrating a group allocation operation of an eNB for D2D communication according to an embodiment of the present invention.

FIG. 10 is a flowchart illustrating a group allocation operation of an eNB for D2D communication according to an embodiment of the present invention.

Referring to FIG. 10, the eNB may receive the signal including channel status information from the UE and configure per-group interference information based thereon at step 1005. The channel status information may include at least one of signal component strength and interference component strength per previously allocated radio resource group.

At step 1010, the eNB may allocate D2D signal transmission/reception radio resources to the groups determined according to the scheduling policy based on the weights or priorities of the groups. The number of groups may be determined according to the size of the radio resource region for interference measurement between D2D UEs in the radio resources. According to an embodiment, it may be possible to allocate the radio resources to the group including more UEs with high priorities first in a resource-limited environment. The priority may be determined based on at least one of latency, QoS, proportional fairness factor, and number of retransmissions.

At step 1015, the eNB may allocate the same D2D signal transmission/reception resources to a group capable of transmitting/receiving signals simultaneously along with the groups to which resource allocation has already been determined, based on the information received at step 1005. The simultaneous transmission possibility may be determined based on the information received at step 1005, i.e. the received signal powers of interference and required signals from the same group, threshold value for comparison, or SIRs of the required and interference signals.

The eNB may determine whether the UEs of all groups have been allocated the radio resources for D2D communication at step 1020. If so, the eNB transmits the resource allocation information to the UEs and ends the group allocation procedure.

If there is any UE which is not allocated radio resource yet, the eNB checks simultaneous transmission possibility for new D2D signal transmission/reception resource allocation to the group determined as a scheduling target among the rest groups according to a policy.

At step 1030, the eNB may allocate the same D2D signal transmission/reception resources to the UEs capable of transmitting/receiving signals in the same radio resources allocated to the group determined at step 1025

Figure 11:
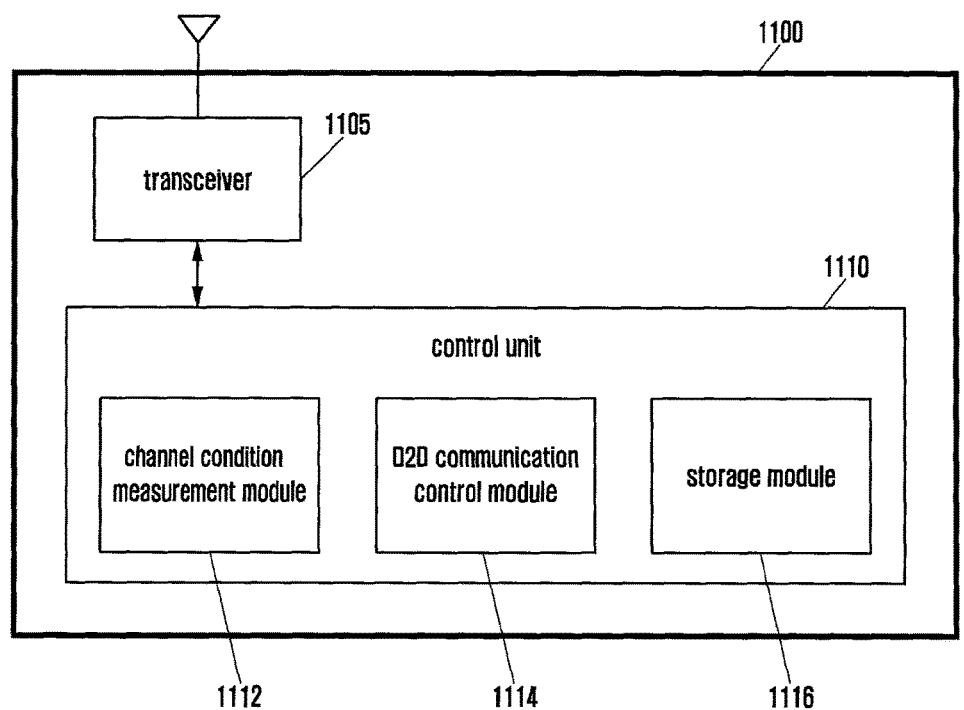
FIG. 11 is a block diagram illustrating a configuration of a UE according to an embodiment of the present invention.

FIG. 11 is a block diagram illustrating a configuration of a UE according to an embodiment of the present invention.

Referring to FIG. 11, the UE 1100 may include a transceiver 1105 and a control unit 1110.

The transceiver 1105 may communicate signals with at least one of an eNB, another UE, and a controller. In an embodiment, the transceiver 1105 may transmit/receive pilot signal for measuring channel condition. The transceiver 1105 may transmit/receive a signal including the information for D2D communication with the eNB.

The control unit 1110 may include a channel condition measurement module 1112, a D2D communication control module 1114, and a storage module 1116. The control unit 1110 may control the overall operations of the UE 1100.

The channel condition measurement module 1112 may measure channel condition for D2D communication based on the pilot signal transmitted by another UE. In detail, it may be possible to measure the channel condition based on the pilot signal component transmitted by a peer D2D UE, i.e. the transmitting UE having an established link, and the pilot signal component transmitted by another UE. It may also be possible to measure the channel condition based on the strengths of the signals transmitted by neighboring eNBs and UEs.

The D2D communication control module 1114 may control to transmit/receive D2D signals to and from another UE in a resource region allocated by the eNB. It may also be possible to control transmitting/receiving D2D communication information to and from the eNB.

The storage module 1116 may store the information related to the operations of the UE 1100. In detail, the storage module 1116 may store the mapping between the D2D communication channel measurement resource regions and indices which is received from the eNB and the information included in the signals transmitted/received by the transceiver selectively.

Figure 12:
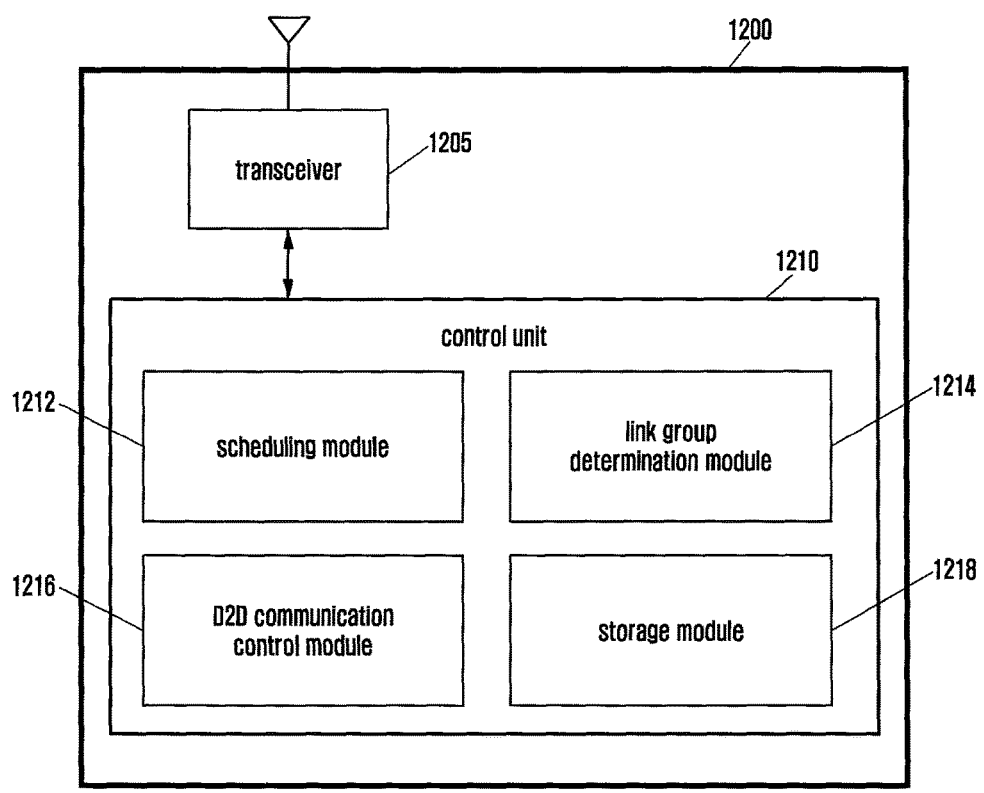
FIG. 12 is a block diagram illustrating a configuration of an eNB according to an embodiment of the present invention.

FIG. 12 is a block diagram illustrating a configuration of an eNB according to an embodiment of the present invention.

Referring to FIG. 12, the eNB 1200 may include a transceiver 1205 and a control unit 1210.

The transceiver 1205 may communicate signals with at least one of UEs and a controller. The transceiver 1205 may communicate signals including the information concerning D2D communication with the UE.

The control unit 1210 may include a scheduling module 1212, a link group determination module 1214, a D2D communication control module 1216, and a storage module 1218. The control unit 1210 may control the overall operations of the eNB 1200.

The scheduling module 1212 may perform scheduling to allocate radio resources to the UEs which transmit and receive signals. The scheduling module 1212 may perform resource allocation such that the UEs being affected by little interference can use the same radio resources based on the channel information received from the UE.

The link group determination module 1214 may organize the D2D communication-enabled UEs into groups and configure the groups to use the same channel measurement radio resources. The D2D communication control module 1216 may determine the information for use in D2D communication of the UEs served by the eNB 1200. The D2D communication control module 1216 may also negotiate with other eNBs for collision avoidance or request to the controller for collision avoidance and link grouping information.

The storage module 1218 may store information concerning the operations of the eNB 1200. In detail, the storage module 1218 may store the mapping between the D2D communication channel measurement resource regions and indices and the information included in the signals transmitted by the transceiver selectively.

Figure 13:
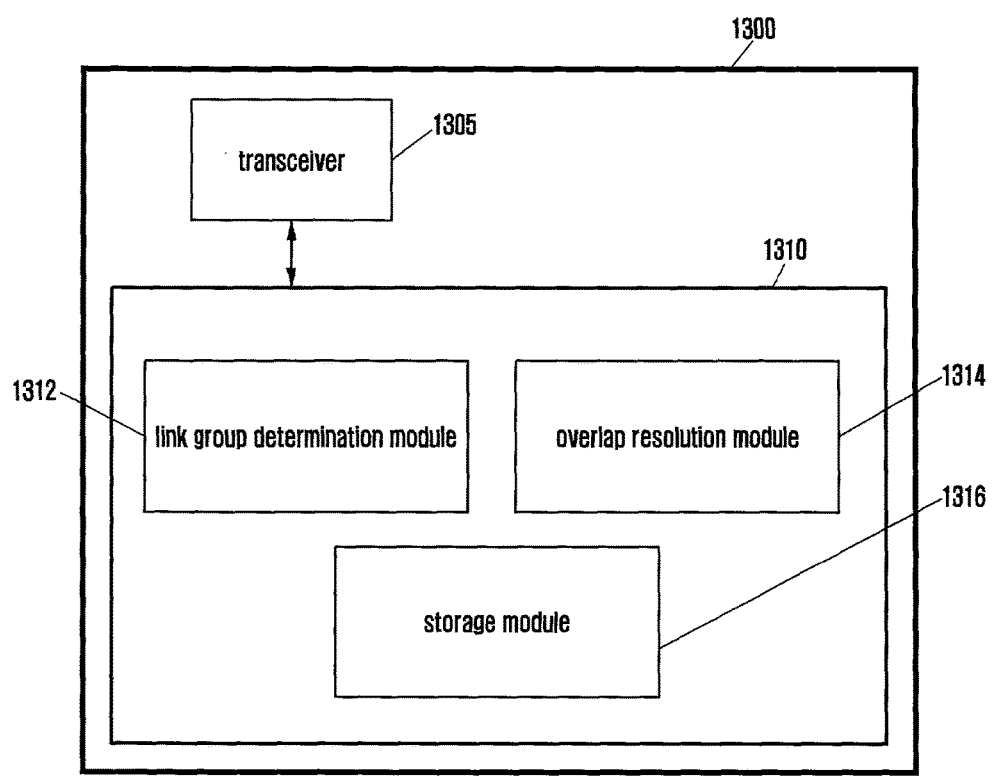
FIG. 13 is a block diagram illustrating a configuration of a controller according to an embodiment of the present invention.

FIG. 13 is a block diagram illustrating a configuration of a controller according to an embodiment of the present invention.

Referring to FIG. 13, the controller 1300 may include a transceiver 1305 and a control unit 1310.

The transceiver 1305 may communicate signals with at least one of eNBs and UEs. In an embodiment, the transceiver 1305 may transmit/receive signals including information concerning D2D communication with the eNB.

The control unit 1310 may include a link group determination module 1312, an overlap resolution module 1314, and a storage module 1316. The control unit 1310 may control the overall operations of the controller 1300.

The link group determination module 1312 may determine a link group for transmitting a pilot signal of the UE which communicates signals with the eNB based on the information received from the eNB.

The overlap resolution module 1314 may organize the UEs significantly affected by interference in the groups in which the D2D communication resources allocated to the UEs communicating signals with the eNB are overlapped into another group.

The storage unit 1316 may store the information concerning the operations of the control unit 1300. In more detail, the storage unit 1316 may store the mapping between the D2D communication channel measurement resource regions and indices and the information included in the signals transmitted/received by the transceiver selectively.

Figure 14:
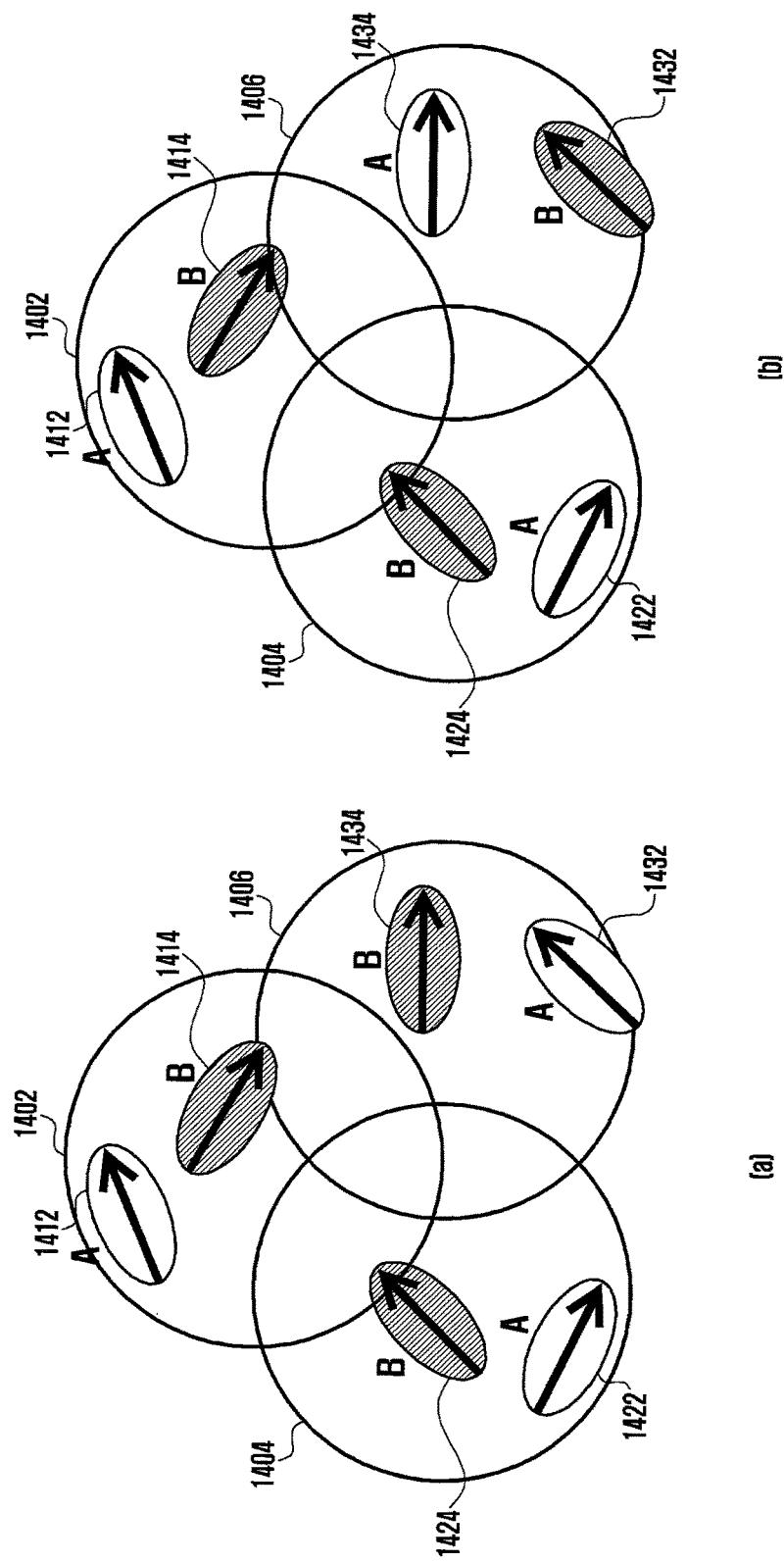
FIG. 14 is a diagram illustrating link groups of UEs for D2D communication according to an embodiment of the present invention.

FIG. 14 is a diagram illustrating link groups of UEs for D2D communication according to an embodiment of the present invention.

Referring to FIG. 14, pairs of D2D communication UEs 1412, 1414, 1422, 1424, 1432, and 1434 are located in the first to third cells 1402, 1404, and 1406. In an embodiment, the UE pairs may be allocated resources for D2D communication based on the signal received from the eNB. In detail, the UE pairs which are little affected by interference may use the same channel measurement resources. In an embodiment, the UE pairs using the same resources are organized into the same group, and there are two groups: group A and group B.

In part (a), the neighboring UE pairs 1414, 1424, and 1434 are organized into group B, and they may cause interference to each other, resulting in communication efficiency degradation.

In part (b), the UE pairs belonging to groups A and B are distributed evenly and thus the UE pairs communicating with the same resources may cause less interference to each other.

In this way, it may be possible to perform channel measurement and measurement report efficiently using the limited resources by allocating the same channel measurement D2D radio resources to the UE pairs causing less interference to each other.

Figure 15:
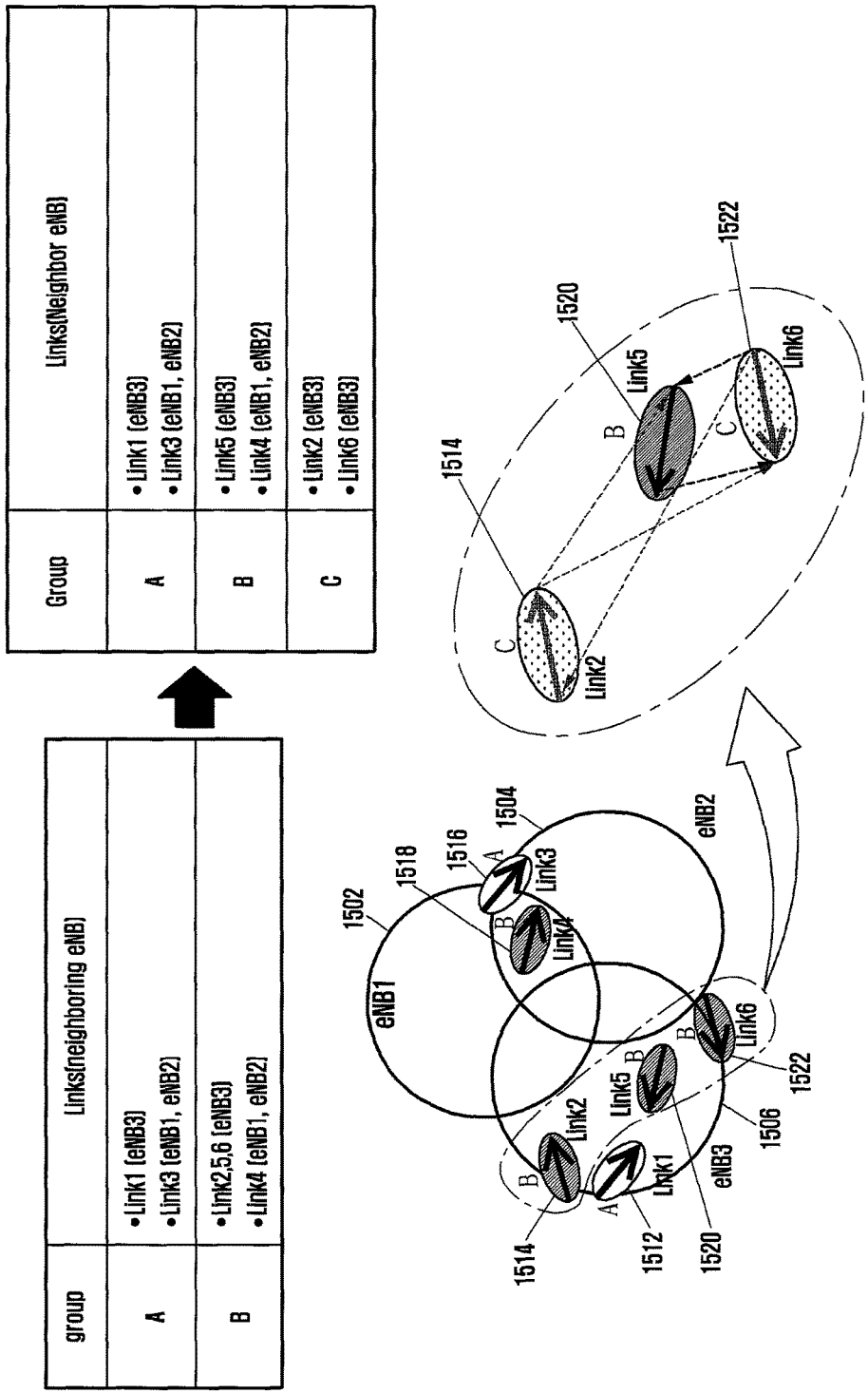
FIG. 15 is a diagram illustrating a link group configuration method according to an embodiment of the present invention.

FIG. 15 is a diagram illustrating a link group configuration method according to an embodiment of the present invention.

Referring to FIG. 15, the first to third eNBs 1502, 1504, and 1506 and the first to sixth UE pairs 1512 to 1522 may communicate signals to each other. In an embodiment, each UE pair may generate a list of neighboring eNBs based on the signals received from neighboring eNBs and report the list to at least one of the eNBs.

In the case of organizing the UE pairs into groups A and B, the first and third UE pairs 1512 and 1516 may be allocated the same resources in group A because their neighboring eNBs differ from each other. In detail, the first UE pair 1512 is located near the third eNB 1506, and the third UE pair 1516 is located near the first and second eNBs 1502 and 1504.

The second, fifth, and sixth UE pairs 1514, 1520, and 1522 may not share any neighboring eNB with the fourth UE pair 1518 so are to be allocated the same resources in group B for D2D communication. In detail, the second, fifth, and sixth UE pairs 1514, 1520, and 1522 are located near the third eNB 1506, and the fourth UE pair 1518 is located near the first and second eNBs 1502 and 1504.

Since the second, fifth, and sixth UE pairs 1514, 1520, and 1522 are located near the same eNB, it may be possible to allocate radio resource for D2D communication to at least one UE pair. The additional radio resources allocation may be performed based on at least one of the neighboring eNB information and neighboring UE information.

In an embodiment, the second, fifth, and sixth UE pairs 1514, 1520, and 1522 may be organized into a group based on the signals communicated between UEs. Although they are organized into group B, it may be possible to check that the second and sixth UE pairs 1514 and 1522 are located far from each other by measuring the signals communicated between UEs and thus to organize the second and sixth UE pairs 1514 and 1522 into group C and allocates measurement resources to them.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A device-to-device (D2D) communication method of a base station in a mobile communication system, the method comprising:
receiving, from a first terminal, first information comprising information on at least one neighboring terminal of the first terminal identified based on a signal received from the at least one neighboring terminal;
identifying at least one group of a terminal based on the first information, a group of the at least one group of the terminal including at least one terminal;
identifying a resource for channel measurement corresponding the group;
transmitting, to a second terminal of the at least one terminal, second information on the resource for channel measurement corresponding to the group; and
receiving, from the second terminal, channel information identified based on the second information and priority information for the group.

2. The method of claim 1, wherein the first information further comprises information on one or more terminals acquired from a neighboring base station of the base station.

3. The method of claim 1, further comprising:
transmitting, to the second terminal, scheduling information for the second terminal, the scheduling information being identified based on at least one of the channel information, latency, service quality, number of retransmissions, and service group priority corresponding to the second terminal.

4. The method of claim 1, further comprising:
receiving, from a neighboring base station or a controller, information related to the at least one group,
wherein the at least one group is identified based on the information related to the at least one group.

5. A device-to-device (D2D) communication method of a terminal in a mobile communication system, the method comprising:
receiving, from a base station, first information on a resource for channel measurement corresponding to a group including the terminal;
transmitting a reference signal for D2D communication based on the first information; and
transmitting, to the base station, channel information identified based on the first information and priority information for the group,
wherein the group is identified based on second information comprising: information on at least one neighboring terminal of another terminal identified based on a signal received the at least one neighboring terminal.

6. The method of claim 5, wherein the second information further comprises information on one or more terminals acquired from a neighboring base station of the base station.

7. The method of claim 5, further comprising:
receiving, from the base station, scheduling information for the terminal, the scheduling information being identified based on at least one of the channel information, latency, service quality, number of retransmissions, and service group priority corresponding to the terminal.

8. The method of claim 5, wherein the group is determined based on information related to the group to which the terminal belongs, the information related to the group being received from a neighboring base station or a controller.

9. A base station supporting device-to-device (D2D) communication in a mobile communication system, the base station comprising:
a transceiver configured to transmit and receive signals; and
a controller coupled with the transceiver and configured to:
receive, from a first terminal, first information comprising information on at least one neighboring terminal of the first terminal identified based on a signal received the at least one neighboring terminal;

identify at least one group of a terminal based on the first information, a group of the at least one group of the terminal including at least one terminal;
identify a resource for channel measurement corresponding to the group;
transmit, to a second terminal of the at least one terminal, second information on the resource for channel measurement corresponding to the group; and
receive, from the second terminal, channel information identified based on the second information and priority information for the group.

10. The base station of claim 9, wherein the first information further comprises information on one or more terminals acquired from neighboring base station of the base station.

11. The base station of claim 9, wherein the controller is further configured to:
transmit, to the second terminal, scheduling information for the second terminal, the scheduling information being identified based on at least one of the channel information, latency, service quality, number of retransmissions, and service group priority corresponding to the second terminal.

12. The base station of claim 9, wherein the controller is further configured to:
receive, from a neighboring base station or a controller, information related to the at least one group,
wherein the at least one group is identified based on the information related to the at least one group.

13. A terminal for performing device-to-device (D2D) communication in a mobile communication system, the terminal comprising:
a transceiver configured to transmit and receive signals; and
a controller coupled with transceiver and configured to:
receive, from a base station, first information on a resource for channel measurement corresponding to a group including the terminal,
transmit a reference signal for D2D communication based on the first information, and
transmit, to the base station, channel information identified based on the first information and priority information for the group,
wherein the group is identified based on second information comprising: information on at least one neighboring terminal of another terminal identified based on a signal received the at least one neighboring terminal.

14. The terminal of claim 13, wherein the second information further comprises information on one or more terminals acquired from neighboring base station of the base station.

15. The terminal of claim 13, wherein the controller is further configured to:
transmit, to the base station, channel information identified based on the first information, and
receive, from the base station, scheduling information for the terminal, the scheduling information being identified based on at least one of the channel information, latency, service quality, number of retransmissions, and service group priority corresponding to the terminal.

16. The terminal of claim 13, wherein the group is determined based on information related to the group to which the terminal belongs, the information related to the group being received from a neighboring base station or a controller.

* * * * *